(12) United States Patent
Abramovsky et al.

(10) Patent No.: US 10,353,545 B2
(45) Date of Patent: Jul. 16, 2019

(54) FLOW AUTOCOMPLETE

(71) Applicant: HEWLETT PACKARD ENTERPRISE DEVELOPMENT LP, Houston, TX (US)

(72) Inventors: Ori Abramovsky, Yehud (IL); Albert Kashchenevsky, Yehud (IL); Asaf Azulai, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 333 days.

(21) Appl. No.: 15/127,687

(22) PCT Filed: Apr. 22, 2014

(86) PCT No.: PCT/US2014/034931
§ 371 (c)(1),
(2) Date: Sep. 20, 2016

(87) PCT Pub. No.: WO2015/163854
PCT Pub. Date: Oct. 29, 2015

(65) Prior Publication Data
US 2017/0131854 A1    May 11, 2017

(51) Int. Cl.
*G06F 3/048* (2013.01)
*G06F 3/0482* (2013.01)
*G06F 3/0481* (2013.01)
*G06F 3/0484* (2013.01)

(52) U.S. Cl.
CPC .......... *G06F 3/0482* (2013.01); *G06F 3/0481* (2013.01); *G06F 3/0484* (2013.01)

(58) Field of Classification Search
CPC ..... G06F 3/0482; G06F 3/0481; G06F 3/0484
USPC ........................................................ 715/811
See application file for complete search history.

(56) References Cited

U.S. PATENT DOCUMENTS

| | | | |
|---|---|---|---|
| 6,564,213 B1 | 5/2003 | Ortega et al. | |
| 7,660,779 B2 | 2/2010 | Goodman et al. | |
| 7,822,699 B2 | 10/2010 | Katariya et al. | |
| 7,908,287 B1 | 3/2011 | Katragadda | |
| 8,190,627 B2 | 5/2012 | Platt et al. | |
| 8,260,938 B2 * | 9/2012 | Gupta | H04L 61/1511 709/228 |
| 8,364,709 B1 * | 1/2013 | Das | G06F 16/90324 707/780 |
| 8,412,728 B1 | 4/2013 | Roskind | |

(Continued)

OTHER PUBLICATIONS

International Search Report & Written Opinion received in PCT Application No. PCT/US2014/034931, dated Jan. 14, 2015, 10 pages.

(Continued)

*Primary Examiner* — David Phantana-angkool

(57) ABSTRACT

In one implementation, a system for protocol determination includes a monitor engine to monitor a number of interactions with a user interface. In addition, the system includes a sequence engine to determine a plurality of steps for each of the number of interactions. In addition, the system includes a reference engine to determine a step from the plurality of steps that corresponds to at least one of the number of interactions. In addition, the system includes a selection engine to suggest a particular interaction with the user interface based on the determined first step.

20 Claims, 3 Drawing Sheets

(56) References Cited

U.S. PATENT DOCUMENTS

| | | | |
|---|---|---|---|
| 8,584,020 B2 | 11/2013 | Kishore et al. | |
| 8,601,019 B1 | 12/2013 | Weininger et al. | |
| 8,645,825 B1 | 2/2014 | Cornea et al. | |
| 8,650,139 B2* | 2/2014 | Jain | G06N 5/022 |
| | | | 706/12 |
| 8,712,931 B1* | 4/2014 | Wahlen | G06F 3/0237 |
| | | | 706/12 |
| 9,372,829 B1* | 6/2016 | Rahmani | G06F 17/00 |
| 2011/0083089 A1* | 4/2011 | Pahud | G06F 3/0425 |
| | | | 715/765 |
| 2012/0296909 A1* | 11/2012 | Cao | G06F 16/9535 |
| | | | 707/737 |
| 2012/0304056 A1* | 11/2012 | Detlef | G06F 17/273 |
| | | | 715/256 |
| 2013/0041878 A1 | 2/2013 | Satyanarayana et al. | |
| 2013/0187868 A1* | 7/2013 | Griffin | G06F 3/04886 |
| | | | 345/173 |
| 2016/0357842 A1* | 12/2016 | Kohlmeier | G06F 3/0481 |
| 2017/0131854 A1* | 5/2017 | Abramovsky | G06F 3/0481 |
| 2017/0308289 A1* | 10/2017 | Kim | G06F 3/04886 |
| 2018/0239500 A1* | 8/2018 | Allen | G06F 3/0482 |
| 2018/0321959 A1* | 11/2018 | Azulai | G06F 9/454 |

OTHER PUBLICATIONS

Mozilla.org., "Applying Machine Learning to Autocomplete," (Web Page), Jan. 1, 2004, 4 pages, available at http://www-archive.mozilla.org/projects/ml/autocomplete/.

Youtube.com, "Autocomplete Algorithm with Javascript Preview," (Web Page), Dec. 6, 2013, 2 pages, available at http://www.youtube.com/watch?v=JeNArakfHqE.

* cited by examiner

FLOW AUTOCOMPLETE

BACKGROUND

A user interface (UI) can include hardware and/or a combination of hardware and software to enable an easier interaction between a user and a computing device. A user interface can help the user to navigate a database and/or facilitate communication with one or more computing devices. A user interface can receive one or more inputs (e.g., by voice and/or touch) to reach a particular position (e.g., state, presentation sequence, etc.) within the user interface. For example, a user interface can receive a plurality of inputs to execute a plurality of instructions that can provide an ability to sequence and/or alter data within a database.

DETAILED DESCRIPTION

Figure 1:
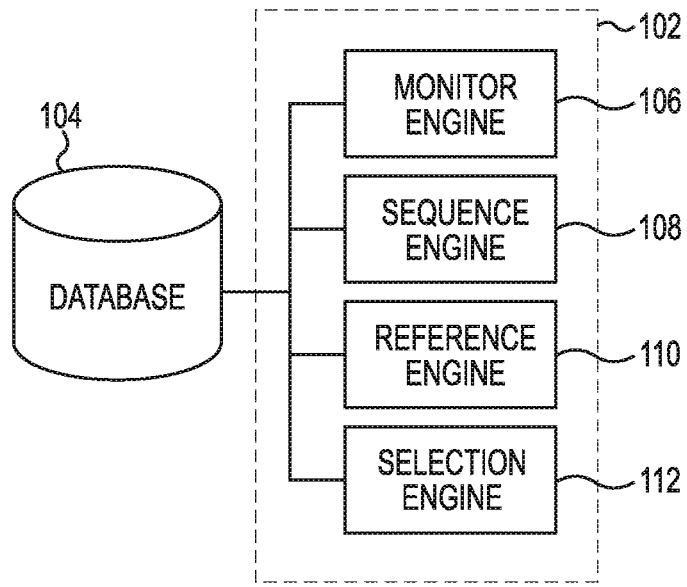
FIG. 1 illustrates a diagram of an example of a system for flow autocomplete according to the present disclosure.

A user interface (UI) can be utilized by a user to navigate a number of databases and/or navigate between a number of computing devices. The user interface can enable a user to execute instructions stored on a computing device. That is, the user interface can receive inputs (e.g., from a user) and respond to the received inputs to execute hardware and/or a combination of hardware and programming to perform a number of functions of a computing device.

While inputs can be received in a multitude of manners (e.g., keystrokes, voice recognition, touchscreen, and/or from others executing instructions without human or user intervention, the disclosure will reference a user providing inputs for ease of illustration. A particular user can utilize the user interface for executing a single process. The single process can include a plurality of interactions and/or steps with the user interface to alter the user interface from a first point (e.g., position, state, location, location within a database, a particular display within the user interface, etc.) to a second point. Interactions and/or steps are referenced herein to describe a user interface that receives inputs and/or processes received inputs. For example, each of the plurality of interactions and/or steps, as described herein, can correspond to the user interface receiving an input, processing the received input, and altering a point within the user interface based on the received input.

In some embodiments, a user may utilize the user interface for executing the single process a plurality of times over a time period. The execution of the single process can include the user having to perform a plurality of interactions every time the user desires to execute the single process. For example, a user may have to make a plurality of selections to reach a desired position within the user interface and/or a desired location within a database and/or computing device.

The interactions of a user with the user interface can be monitored and utilized to determine a number of points and/or locations that the user visits while utilizing the user interface. The number of points and/or locations can include a specific state within the user interface and/or a specific space within a database.

Monitoring the interactions with the user interface can include determining a number of steps and/or interactions that can be performed to reach each of the number of points and/or locations. For example, there can be two interactions with the user interface to reach a desired point and/or location. In this example, the two interactions can be monitored and the two interactions can be stored as interactions that correspond to the desired point and/or location.

The monitored interactions can be utilized to predict and suggest locations that the user may want to reach via the user interface. The locations can be presented to the user via displaying a link to the locations. The user can then select the displayed link to the location and the link can correspond to executing the number of steps and/or interactions that were monitored and correspond to the selected link.

Flow auto complete can be utilized by a user interface to increase user efficiency by monitoring a user's interactions with the user interface and suggesting locations and/or positions based on the user's interactions. The suggested locations can save the user from having to make a plurality of selections via a number of steps to reach the suggested location. The suggested location can be a location that is in the same or different user interface as the monitored locations. For example, the number of steps and/or interactions can include interactions with a plurality of user interfaces. In this example, the monitored interactions that are utilized to predict and suggest locations can be in a first user interface and the suggested locations can include locations within a second user interface.

Figure 2:
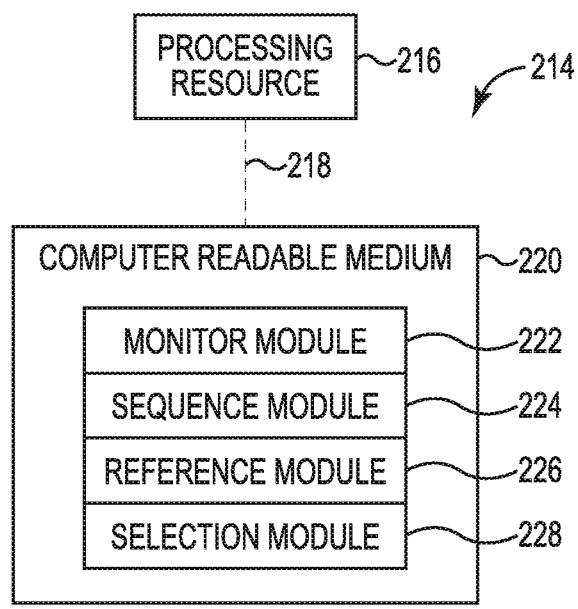
FIG. 2 illustrates a diagram of an example computing device according to the present disclosure.

FIGS. 1 and 2 illustrate examples of system 100 and computing device 214 according to the present disclosure. FIG. 1 illustrates a diagram of an example of a system 100 for flow autocomplete according to the present disclosure. The system 100 can include a database 104, a flow autocomplete system 102, and/or a number of engines (e.g., monitor engine 106, sequence engine 108, reference engine 110, protocol engine 112). The flow autocomplete system 102 can be in communication with the database 104 via a communication link, and can include the number of engines (e.g., monitor engine 106, sequence engine 108, reference engine 110, selection engine 112, etc.). The flow autocomplete system 102 can include additional or fewer engines that are illustrated to perform the various functions as will be described in further detail in connection with FIG. 3.

The number of engines (e.g., monitor engine 106, sequence engine 108, reference engine 110, protocol engine 112) can include a combination of hardware and programming that is configured to perform a number of functions described herein (e.g., monitor a number of interactions with a user interface, determine a plurality of steps for each of the number of interactions, determine a step/sequence from the plurality of steps that corresponds to at least one of the number of interactions, display a particular interaction with the user interface based on the determined first step, etc.). The programming can include program instructions (e.g., software, firmware, etc.) stored in a memory resource (e.g., computer readable medium, machine readable medium, etc.) as well as hard-wired program (e.g., logic).

The monitor engine 106 can include hardware and/or a combination of hardware and programming to monitor a number of interactions with a user interface, determine a plurality of steps for each of the number of interactions. The number of interactions can include a number a selections that can be executed by a user. For example, the number of interactions can include database and/or location selections to navigate to different states and/or positions within the user interface. As described herein, a user may have to make the same and/or similar selections a plurality of times to reach the same and/or similar position (e.g., state) within the user interface. The monitor engine 106 can include hardware and/or a combination of hardware and programming to monitor and record a particular user's interactions over a period of time.

The sequence engine 108 can include hardware and/or a combination of hardware and programming to determine a plurality of steps (e.g., sequence, plurality of sequences, etc.) for each of the number of interactions. The plurality of steps can include the selections that a user executes via the user interface to produce the number of interactions and/or to reach a desired position within a database via the user interface. The number of steps can include, but are not limited to: yes/no selections, location selections, database selections, category selections, among other selections that indicate a desired state and/or position within a database via the user interface.

The reference engine 110 can include hardware and/or a combination of hardware and programming to determine a step from the plurality of steps that corresponds to at least one of the number of interactions. As described herein, the plurality of steps can include the decisions and/or selections by a user via the user interface to reach a particular position within a database. The determined step and/or combination of steps can be determined by the reference engine 110 to correspond to a particular end location and/or particular interaction with the user interface. For example, a user selecting step 1 can be an indication to the reference engine 110 that the user may want to perform a particular interaction with the user interface and/or that the user may want to reach a particular position within a particular database. In another example, a user selecting step A, then step B, and then step C can be an indication to the reference engine 110 that the user may want to perform a particular interaction with the user interface and/or that the user may want to reach a particular position within a particular database.

The selection engine 112 can include hardware and/or a combination of hardware and programming to display a particular interaction and/or particular position within the user interface based on the determined first step. As described herein, the first step can be a single step and/or a combination of a plurality of steps that can correspond to the particular interaction. That is, the first step can be a selection made by the user that can indicate that the user desires to perform the particular interaction and/or reach a particular position within a database via the user interface. The selection engine can include hardware and/or a combination of hardware and programming to display a link to perform the particular interaction. That is, the link can include instructions that when selected by the user, can perform each of the number of steps that a user may be required to select to perform the particular interaction and/or reach a particular position within a database.

By utilizing flow autocomplete, a user can save time and resources by selecting the link that is displayed by the selection engine 112 when the user desires to perform a particular interaction that corresponds to the link. The user may not have to make a plurality of additional selections and/or perform a plurality of additional steps to perform the particular interaction.

FIG. 2 illustrates a diagram of an example computing device 214 according to the present disclosure. The computing device 214 can utilize software, hardware, firmware, and/or logic to perform a number of functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., monitor a number of interactions with a user interface, wherein the number of interactions include a number of particular points within the user interface, determine a plurality of steps to reach each of the number of particular points within the user interface, receive an interaction, from a user, that includes at least one of the plurality of steps, send a message to the user, wherein the message includes a list of particular points that correspond to the received interaction, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., monitor module 222, sequence module 224, reference module 226, selection module 228) can include CRI that when executed by the processing resource 216 can perform a number of functions. The number of modules (e.g., monitor module 222, sequence module 224, reference module 226, selection module 228) can be sub-modules of other modules. For example, the sequence module 224 and the reference module 226 can be sub-modules and/or contained within the same computing device. In another example, the number of modules (e.g., monitor module 222, sequence module 224, reference module 226, selection module 228) can comprise individual modules at separate and distinct locations (e.g., CRM, etc.).

Each of the number of modules (e.g., monitor module 222, sequence module 224, reference module 226, selection module 228) can include instructions that when executed by the processing resource 216 can function as a corresponding engine as described herein. For example, the monitor module 222 can include instructions that when executed by the processing resource 216 can function as the monitor engine 106. In another example, the selection module 228 can include instructions that when executed by the processing resource 216 can function as the selection engine 112.

Figure 3:
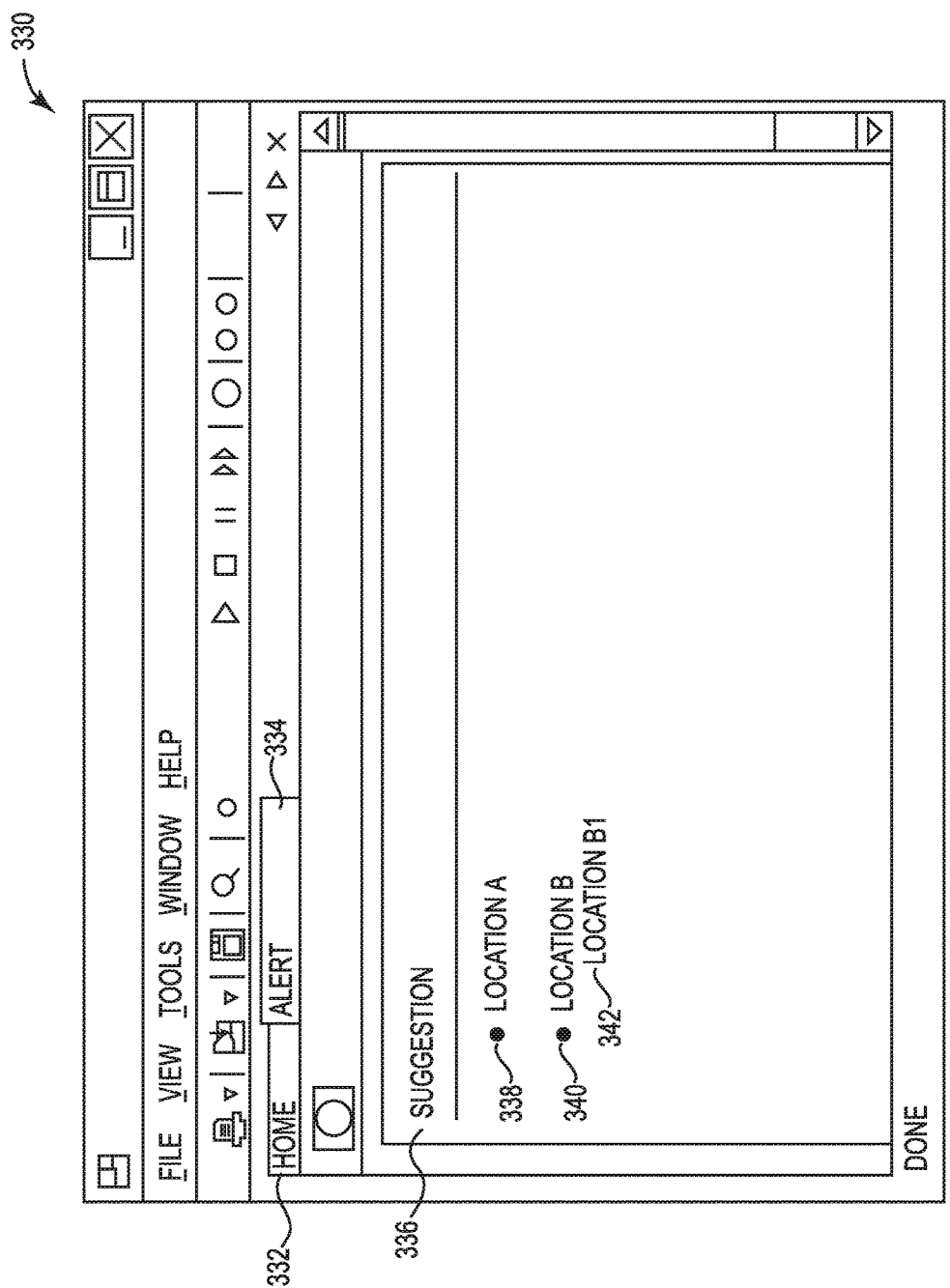
FIG. 3 illustrates a user interface for flow autocomplete according to the present disclosure.

FIG. 3 illustrates a user interface 330 for flow autocomplete according to the present disclosure. The user interface 330 can include a variety of different user interface platforms (e.g., Windows, iOS, Linux, Chrome, Internet Explorer, etc.). The user interface can include a number of windows and/or tabs (e.g., home tab 332, alert tab 334, etc.). The tabs can be utilized to perform the same or different interactions with the user interface. For example, a home tab 332 can be utilized to perform a number of interactions with the user interface. In another example, the alert tab 334 can be utilized to notify the user of various alerts and/or notifications. In some embodiments, a plurality of user interface platforms can be utilized. In these embodiments, interactions with a first user interface can be utilized to determine and alert the user of a suggested location within a second user interface. In certain embodiments, a user may be able to entirely skip a user interface by selecting the suggested location. For example, a user can interact with a first user interface and a location can be displayed to the user via an alert tab 334. In this example, the user can select a link to the location and a number of corresponding steps can be executed via a second user interface and the location can be within a third user interface. That is, the user may not have to complete an interaction with the second user interface to reach the location within the third user interface.

The alert tab 334 can be a pop-up screen that provides a number of suggestions. The number of suggestions can include a number of links that correspond to a location within a database and/or an interaction with the user interface. There can be a plurality of suggestions based on a user's interactions with the user interface 330. As described herein, a user can execute a number of interactions and/or perform a number of steps with the user interface 330 and the number of interactions and/or number of steps can be monitored and utilized predict and suggest locations and/or interactions that the user is likely to execute with the user interface 330.

The suggested locations (e.g., Location A 338, Location B 340, Location B1 342, etc.) can be included within a suggestion window 336. The suggested locations can be based on the user's interaction within the home tab 332. As described herein, the suggested locations can be locations and/or interactions with the user interface 330 that include the user's interactions within the home tab 332. In one embodiment, each of the suggested locations can include a plurality of steps and/or interactions to reach the suggest location.

The user's interactions within the home tab 332 can correspond to a portion of the plurality of steps and/or interactions to reach the suggested location. For example, the user's interactions can include an initial step (e.g., first step, first combination of steps, steps to indicate a location, combination of steps to indicate a location, etc.) that can be identified as a step and/or interaction with the user interface 330 that corresponds to the plurality of steps for reaching a suggested location.

The suggested locations can each include a link that can execute the plurality of steps and/or interactions to reach the corresponding location. For example, Location A 338 can be a link that when selected by a user can execute a plurality of steps to bring the user interface 330 to a particular database location A. The plurality of steps can include, but is not limited to: filling in an answer to a number of questions, making a selection for a number of selection based options, and/or selecting a database from a number of databases.

In some embodiments, the suggested locations can include a tier of suggested locations. The tier of suggested locations can include a plurality of locations that have a relationship with each other. For example, Location B 340 can be a location of a database with a plurality of topics comprised therein. In this example, Location B1 342 can be a location of a particular topic from the plurality of topics within the database that corresponds to Location B 340.

As described herein, the alert tab 334 can be displayed based on the monitored interactions of the user with the user interface 330. The user can then select a suggested location from the suggestion window 336 to execute a number of steps that are required to reach the corresponding suggested location.

Figure 4:
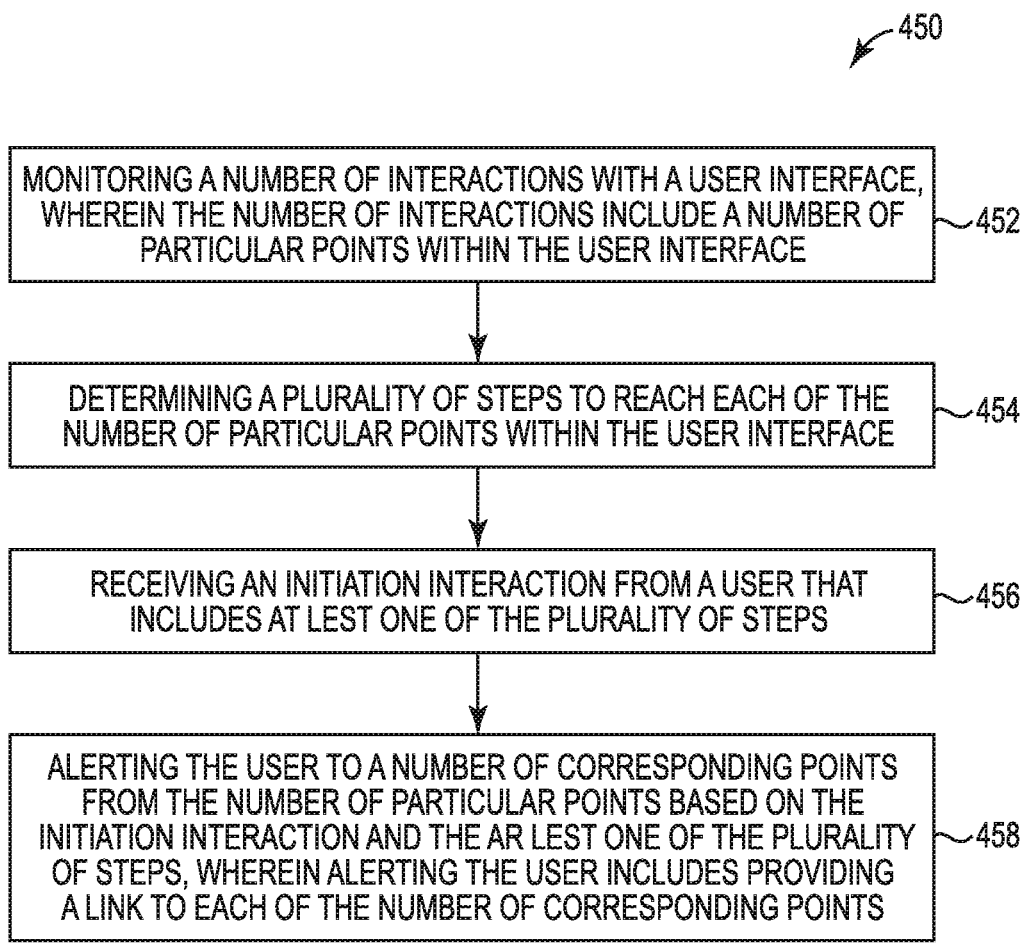
FIG. 4 is a flow chart of an example of a method for flow autocomplete according to the present disclosure.

FIG. 4 is a flow chart of an example of a method 450 for flow autocomplete according to the present disclosure. The method 450 can be executed on a computing system as described herein. In some embodiments, the method 450 can be implemented on a legacy user interface (e.g., previously existing user interface, user interface not originally designed to perform the method 450, etc.). In certain embodiments, the method 450 can be performed across multiple user interface systems. That is, the method 450 can be performed on a computing system that utilizes a plurality of different user interface systems to navigate the computing system.

At box 452 the method 450 can include monitoring a number of interactions with a user interface, wherein the number of interactions include a number of particular points (e.g., locations, states, etc.) within the user interface. Monitoring the number of interactions can include monitoring a number of selections by a user via the user interface. Each of the number of selections can prompt a different selection and/or display a new point (e.g., state, location) of the user interface. In some embodiments, monitoring the number of interactions can include monitoring a number of interactions over a plurality of different user interfaces. For example, the monitoring can include monitoring a number of user interactions from a first user interface that can include executing a second user interface. In addition, the monitoring can include the user interactions with the second user interface.

At box 454 the method 450 can include determining a plurality of steps to reach each of the number of particular points within the user interface. As described herein, reaching a particular point (e.g., state, location) within a user interface can include executing a plurality of steps. The plurality of steps can include a variety of user executed selections via the user interface. The plurality of steps can include selections that when executed display a new window and/or tab within the user interface. The plurality of steps can include selections such as database selections, application selections, user interface selections, and/or user interface switching selections. That is, the plurality of steps can include a variety of different selections by a user that is interacting with a user interface and/or a plurality of different user interfaces.

The method 450 can also include mapping the number of interactions by mapping a frequency of a user interacting with a particular point of the user interface with the corresponding steps to reach the particular point of the user interface. Mapping the number of interactions can include storing the user interactions of the user with corresponding points and/or locations within the user interface. The mapped number of interactions can be utilized to determine an initiation interaction (e.g., first step, initiation step, combination of steps and/or interactions with the user interface, etc.) from the user. In addition, the mapped number of interactions can be utilized to execute a number of steps and/or user interactions to reach the particular point and/or state within the user interface that corresponds to the number of interactions.

At box 456 the method 450 can include receiving an initiation interaction from a user that includes at least one of the plurality of steps. Receiving the initiation interaction can include receiving an initiation interaction from a user that is utilizing the user interface. The initiation interaction can include a number of steps and/or interactions with the user interface that are included in the number of interactions that correspond to a particular location and/or state of the user interface. In some embodiments the initiation interaction can include a single step or a plurality of steps that are mapped to a particular interaction with the user interface. That is, interactions with the user interface can be monitored and compared to user interactions that are stored and/or mapped to a particular location and/or state of the user interface. When there is a match of monitored interactions with the stored and/or mapped interactions, the particular location and/or state of the user interface can be predicted and presented to the user via an alert.

At box 458 the method 450 can include alerting the user to a number of corresponding points (e.g., location, position, state, etc.) from the number of particular points based on the initiation interaction and the at least one of the plurality of steps, wherein alerting the user includes providing a link for each of the number of corresponding points. The number of corresponding points can include a corresponding location and/or state within the user interface to the number of monitored interactions included in the initiation interaction. As described herein, a user's interactions can be monitored and mapped to a corresponding point and/or location within a user interface. When an initiation interaction is monitored that corresponds to the monitored user interactions for a particular location, the particular location can be displayed to the user via an alert (e.g., alert tab, alert window, etc.).

The alert can include a link to the particular point and/or particular location. That is, a user can select the link to the corresponding point and the number of interactions that correspond to the selected link can be automatically executed to reach the corresponding point. In some embodiments, the particular point and/or particular location can be within the same and/or different user interface as the initiation interaction. That is, the initiation interaction can include a number of user interactions with a first user interface of a system and the user can be alerted to a number of corresponding points that are located within a second user interface of the system.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
 a monitor engine to monitor a number of interactions with a user interface, each interaction comprising at least one user selection;
 a sequence engine to:
  determine a plurality of locations in the user interface associated with the number of interactions;
  determine a plurality of user selection sequences, each user selection sequence comprising a set of user selections to reach a location of the plurality of locations;
  store mapping data indicating the plurality of user selection sequences and associated locations;
 a reference engine to:
  detect an initiation interaction comprising at least one user selection performed in the user interface;
  determine, based on the stored mapping data, a set of locations corresponding to user selection sequences that match the initiation interaction, wherein the set of locations are not directly reached by the initiation interaction;
 a selection engine to:
  display, to a user, a set of links to the determined set of locations; and
  in response to a selection of a first link to a first location, automatically execute a first plurality of user selections using the stored mapping data to reach the first location in the user interface.

2. The system of claim 1, wherein the user interface and the set of links are displayed in separate windows.

3. The system of claim 1, wherein the user interface and the set of links are displayed in separate tabs.

4. The system of claim 1, wherein the first plurality of user selections are executed in a plurality of user interfaces.

5. The system of claim 1, wherein each location of the plurality of locations is associated with a particular state of the user interface.

6. The system of claim 1, wherein the stored mapping data comprises frequency information of the plurality of user selection sequences being performed to reach the associated locations.

7. The system of claim 1, wherein the set of links are displayed in a tiered relationship.

8. A non-transitory computer readable medium storing instructions executable by a processing resource to cause a controller to:
 monitor a number of interactions with a user interface, wherein the number of interactions are associated with a number of particular locations within the user interface, each interaction comprising at least one user selection;
 determine a plurality of user selection sequences, each user selection sequence comprising a set of user selections to reach each of the number of particular locations within the user interface;
 store mapping data indicating the plurality of user selection sequences and associated locations;
 receive an initiation interaction, from a user, that includes at least one user selection performed in the user interface;
 determine, based on the stored mapping data, a set of locations corresponding to user selection sequences that match the initiation interaction, wherein the set of locations are not directly reached by the initiation interaction;

display, to a user, a set of links to the determined set of locations; and in response to a selection of a first link to a first location, automatically execute a first plurality of user selections using the stored mapping data to reach the first location in the user interface.

9. The medium of claim 8, wherein the user interface and the set of links are displayed in separate windows.

10. The medium of claim 8, wherein the user interface and the set of links are displayed in separate tabs.

11. The medium of claim 8, wherein the first plurality of user selections are executed in a plurality of user interfaces.

12. A method comprising:

monitoring a number of interactions with a user interface, wherein the number of interactions are associated with a number of particular locations within the user interface, each interaction comprising at least one user selection;

determining a plurality of user selection sequences, each user selection sequence comprising a set of user selections to reach each of the number of particular locations within the user interface;

storing mapping data indicating the plurality of user selection sequences and associated locations;

receiving an initiation interaction from a user that includes at least one user selection performed in the user interface;

determining, based on the stored mapping data, a set of locations corresponding to user selection sequences that match the initiation interaction, wherein the set of locations are not directly reached by the initiation interaction;

displaying, to a user, a set of links to the determined set of locations;

receiving a selection of a first link to a first location; and in response to the selection of the first link, automatically executing a first plurality of user selections using the stored mapping data to reach the first location in the user interface.

13. The method of claim 12, wherein the user interface and the set of links are displayed in separate windows.

14. The method of claim 12, wherein the user interface and the set of links are displayed in separate tabs.

15. The method of claim 12, wherein the first plurality of user selections are executed in a plurality of user interfaces.

16. The method of claim 12, wherein each location of the plurality of locations is associated with a particular state of the user interface.

17. The method of claim 12, wherein the stored mapping data comprises frequency information of the plurality of user selection sequences being performed to reach the associated locations.

18. The method of claim 12, wherein the set of links are displayed in a tiered relationship.

19. The medium of claim 8, wherein each location of the plurality of locations is associated with a particular state of the user interface.

20. The medium of claim 8, wherein the stored mapping data comprises frequency information of the plurality of user selection sequences being performed to reach the associated locations.

* * * * *